(12) United States Patent
Brunnert et al.

(10) Patent No.: US 11,174,049 B2
(45) Date of Patent: Nov. 16, 2021

(54) METHOD OF UPHOLSTERING TRUSS

(71) Applicant: L&P Property Management Company, South Gate, CA (US)

(72) Inventors: John J. Brunnert, Carthage, MO (US);
John E. Hull, Monett, MO (US);
Daniel Meyer, Carthage, MO (US);
Randall A. Wood, Oronogo, MO (US)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 16/994,071

(22) Filed: Aug. 14, 2020

(65) Prior Publication Data
US 2020/0377243 A1    Dec. 3, 2020

Related U.S. Application Data

(62) Division of application No. 16/129,132, filed on Sep. 12, 2018, now Pat. No. 10,793,302.

(51) Int. Cl.
| | | |
|---|---|---|
| *B65B 9/02* | (2006.01) | |
| *F16B 12/14* | (2006.01) | |
| *A47C 19/02* | (2006.01) | |
| *B68G 15/00* | (2006.01) | |
| *A47C 31/02* | (2006.01) | |

(52) U.S. Cl.
CPC .............. *B65B 9/026* (2013.01); *F16B 12/14* (2013.01); *A47C 19/028* (2013.01)

(58) Field of Classification Search
CPC ....... B65B 9/026; F16B 12/14; A47C 19/028; A47C 19/021; A47C 31/023; B68G 15/005
See application file for complete search history.

(56) References Cited

U.S. PATENT DOCUMENTS

| | | | | |
|---|---|---|---|---|
| 3,371,466 A | * | 3/1968 | Klopfenstein | .......... B65B 11/12 53/206 |
| 3,840,167 A | * | 10/1974 | Otteman | .................... B27F 7/00 227/76 |
| 4,461,136 A | * | 7/1984 | Hudson | .................... B65B 11/04 53/211 |
| 4,832,152 A | * | 5/1989 | Schuelke | ............. A47B 83/001 181/286 |
| 5,129,569 A | * | 7/1992 | Stanton | ..................... B68G 7/05 227/13 |
| 5,258,083 A | * | 11/1993 | Monk | .................... E04B 2/7409 156/212 |
| 5,878,470 A | * | 3/1999 | Blansett | ................. A47C 4/028 29/91.1 |
| 6,032,345 A | * | 3/2000 | Resta | ....................... B68G 7/08 112/2.2 |

(Continued)

*Primary Examiner* — Bayan Salone
(74) *Attorney, Agent, or Firm* — Wood Herron & Evans LLP

(57) ABSTRACT

An apparatus for upholstering a truss allows an operator to staple a fabric web to the truss, rotate the truss, further staple the semi-finished truss and cut the fabric web. The truss is fully upholstered after the end surfaces of the truss are wrapped up in fabric and the fabric stapled in place. The apparatus may accommodate different size trusses. A web of fabric is pulled around at least one roller in the apparatus by rotation of two vise mechanisms on opposite sides of the truss.

7 Claims, 20 Drawing Sheets

(56) References Cited

U.S. PATENT DOCUMENTS

| | | | | |
|---|---|---|---|---|
| 7,395,590 B2* | 7/2008 | Johnson | ............ | A47C 7/28 |
| | | | | 29/448 |
| 7,789,986 B2* | 9/2010 | Brown | ............ | B68G 7/05 |
| | | | | 156/216 |
| 8,205,311 B2* | 6/2012 | Woellper | ............ | B68G 7/12 |
| | | | | 29/91 |
| 8,453,306 B2* | 6/2013 | Mazza | ............ | B68G 15/00 |
| | | | | 29/91.1 |
| 8,990,979 B1* | 3/2015 | Craver | ............ | A47C 19/021 |
| | | | | 5/400 |
| 10,414,525 B2 | 9/2019 | Zoboli | | |
| 10,525,557 B2* | 1/2020 | Subhedar | ............ | A47C 27/064 |
| 10,793,302 B2* | 10/2020 | Brunnert | ............ | B68G 15/005 |
| 10,981,776 B2* | 4/2021 | Brummett | ............ | B68G 7/12 |
| 2002/0046452 A1* | 4/2002 | Kinney | ............ | B68G 7/05 |
| | | | | 29/91.1 |
| 2007/0214625 A1* | 9/2007 | Brown | ............ | B68G 15/005 |
| | | | | 29/91.1 |
| 2010/0011553 A1* | 1/2010 | Mazza | ............ | B68G 7/05 |
| | | | | 29/91 |
| 2010/0293771 A1* | 11/2010 | Woellper | ............ | B68G 7/12 |
| | | | | 29/91.1 |
| 2014/0251193 A1* | 9/2014 | Resta | ............ | D05B 39/00 |
| | | | | 112/475.08 |
| 2016/0200470 A1 | 7/2016 | Zoboli et al. | | |
| 2016/0214219 A1* | 7/2016 | Subhedar | ............ | A47C 27/05 |
| 2017/0105538 A1* | 4/2017 | Graham | ............ | A47C 21/00 |
| 2017/0136730 A1* | 5/2017 | Dawson | ............ | B32B 5/026 |

\* cited by examiner

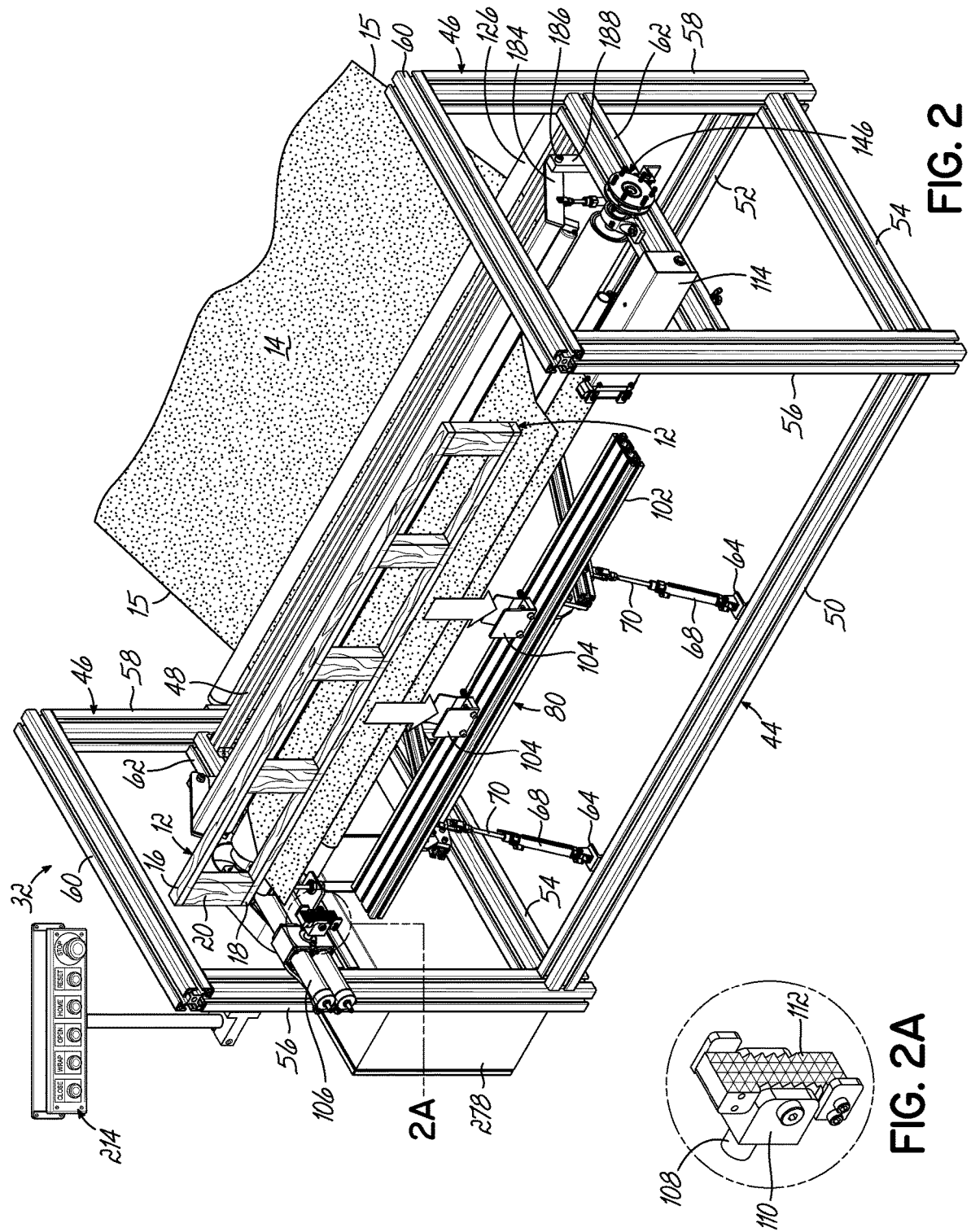

METHOD OF UPHOLSTERING TRUSS

CROSS REFERENCE TO RELATED APPLICATION

This application is a divisional of U.S. patent application Ser. No. 16/129,132 filed Sep. 12, 2018 (pending) which is fully incorporated herein.

TECHNICAL FIELD

The present invention relates generally to trusses for use in bedding products such as ready to assemble ("RTA") bedding foundations.

BACKGROUND

Bedding and seating products often have a rectangular wooden frame comprising four or more pieces. Two of the pieces are side pieces, one is a head end piece and the last piece is a foot end piece. In some bedding foundations, the wooden pieces of the frame are oriented with the larger of their width and height dimensions facing up and down. In other bedding and seating products the frame pieces are oriented "on edge" with the lesser of their width and height dimensions facing up and down. Securing a wooden side rail oriented "on edge" to a wooden head or foot rail oriented "on edge" is difficult due to the orientation of the rails. Different types of connectors secure the trusses together.

In today's world of e-commerce, bedding foundations have been made to fit and ship in a box. These bedding foundations are specially designed to be easily assembled by a consumer when they arrive at the customer's residence. These bedding foundations are known as ready to assemble ("RTA") bedding foundations or otherwise referred to as bed-in-a-box in the bedding industry. In order to reduce the weight of the bedding foundation wooden trusses, rather than solid wooden pieces, have been incorporated into the foundation. To improve the appearance of the foundation, the wooden trusses have been covered in fabric.

Before the present invention, an operator had to manually wrap a wooden truss in fabric, cut the fabric to the desired size and secure the fabric to the wooden truss.

Accordingly, there is a need for an apparatus for wrapping a wooden truss in fabric.

SUMMARY

According to an exemplary embodiment, an apparatus for upholstering a truss for a bedding foundation with fabric comprises a base and two sides secured to the base. A rear brace extends between the sides for stability. The apparatus further comprises a first vise mechanism secured to one side of the apparatus and a second vise mechanism secured to another side of the apparatus for gripping and rotating the truss. At least one of the vise mechanisms is movable to pinch the truss between the vise mechanisms so the vise mechanisms may rotate the truss. The apparatus further comprises a truss fixture table movable between raised and lowered positions by pneumatically controlled cylinders secured to the base. The apparatus further comprises a rotatable tension roller surrounding a shaft. The shaft extends between bearing assemblies attached to the sides of the apparatus. A spring-loaded brake assembly is secured to the shaft at one end of the rotatable tension roller to slow the rotation of the tension roller as fabric moves through the apparatus.

According to another aspect of the invention, an apparatus for upholstering a truss for a bedding foundation with fabric comprises a base and two sides secured to the base. A rear brace extends between the sides for stability. The apparatus further comprises a first vise mechanism secured to one side of the apparatus for gripping and rotating one side of the truss. The apparatus further comprises a second vise mechanism secured to another side of the apparatus for gripping and rotating another side of the truss. The apparatus further comprises a truss fixture table movable between raised and lowered positions by pneumatically controlled cylinders secured to the base. At least one of the vise mechanisms is movable to pinch the truss between the vise mechanisms so the vise mechanisms may rotate the truss with the truss fixture table in its lowered position. The apparatus further comprises a rotatable tension roller surrounding a shaft. The shaft extends between bearing assemblies attached to the sides of the apparatus. A spring-loaded brake assembly is secured to the shaft at one end of the rotatable tension roller to slow the rotation of the tension roller as fabric moves through the apparatus.

According to another aspect of the invention, a method of wrapping fabric around a truss for a bedding foundation comprises the following steps. The first step is providing a roll of fabric supported by a fabric cart. The steps further include providing a wrapping apparatus comprising a base, two sides secured to the base, a truss fixture table movable between raised and lowered positions by pneumatically controlled cylinders secured to the base, a first vise mechanism secured to one side of the apparatus, a second vise mechanism secured to another side of the apparatus and a rotatable tension roller surrounding a shaft. The shaft extends between bearing assemblies attached to the sides of the apparatus. The method further comprises passing fabric from the roll of fabric through the wrapping apparatus. Another step comprises activating one of the vise mechanisms to move the vise mechanism in a linear direction towards the other vise mechanism to pinch the truss between the vise mechanisms. Another step comprises stapling the fabric to an upper surface of the truss. Another step comprises moving the truss fixture table to its lowered position and rotating the truss with the vise mechanisms. After the truss is fully wrapped, the method includes further stapling the fabric to the truss; and cutting the fabric to create a wrapped truss.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

The drawings, which are incorporated in and constitute a part of this specification, illustrate embodiments of the invention and, together with the general description given above and the detailed description given below, explain the embodiments of the invention.

FIG. 2 is a perspective view of the apparatus of FIG. 1, showing a truss being inserted into the truss fixture table of the apparatus, the truss fixture table being in its raised position.

FIG. 2A is an enlarged perspective view of the encircled area 2A of FIG. 2.

DETAILED DESCRIPTION

Figure 1:
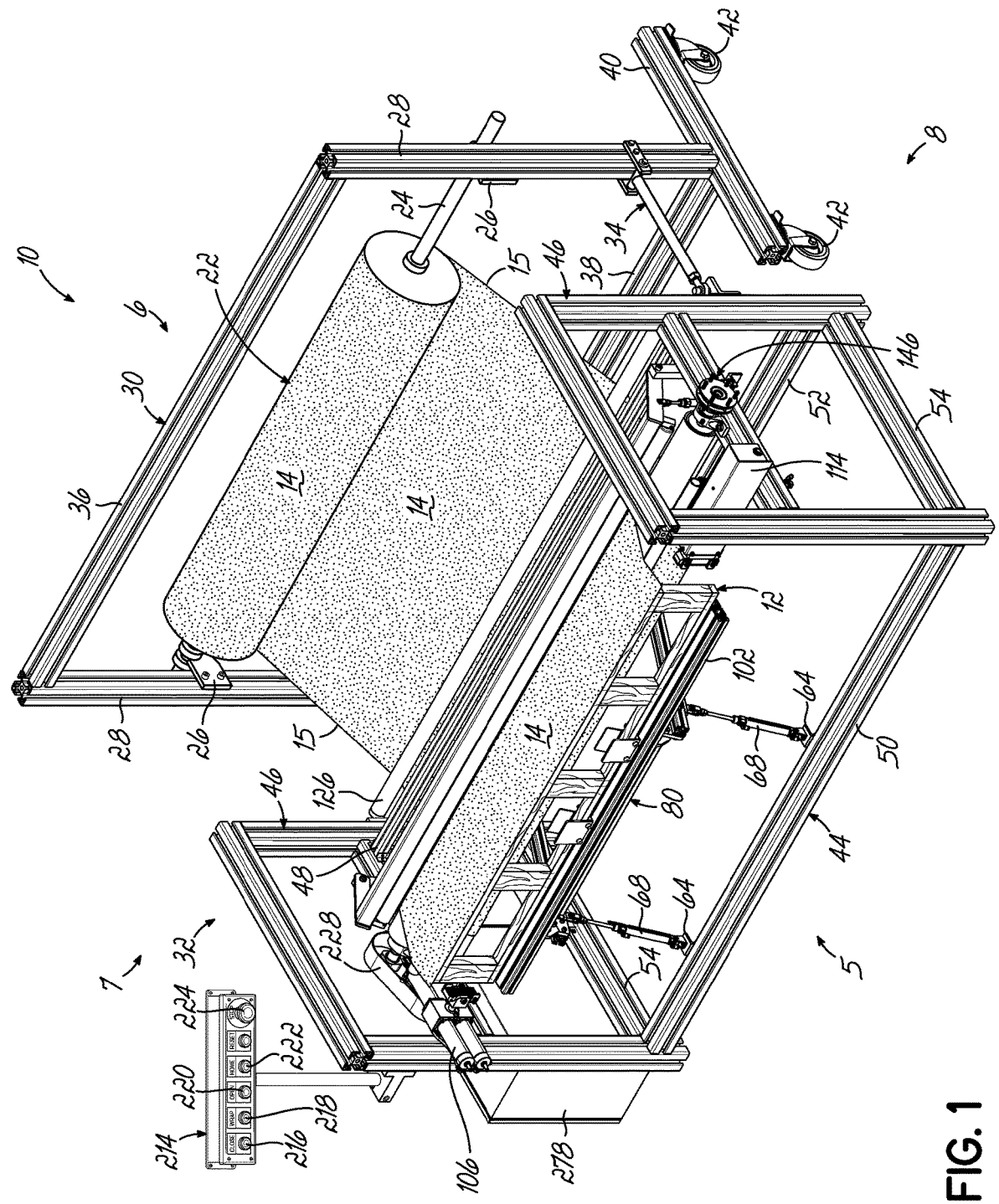
FIG. 1 is a perspective view of an apparatus for upholstering a truss for a bedding foundation with fabric.

Referring now to FIG. 1, an apparatus 10 for upholstering a truss 12 for a bedding foundation (not shown) with fabric is shown. As best shown in FIG. 2, the truss 12 comprises an upper member 16, a lower member 18 and a plurality of spacers 20 secured to the upper and lower members 16, 18. Various components of the truss 12 are typically constructed of wood but may be plastic and/or metal. It will be appreciated that the components of the truss 12 may be constructed of any suitable material.

As best shown in FIG. 1, a fabric web 14 having side edges 15, the linear distance between which defines a width "W" of the fabric web. The fabric web 14 is supplied from a roll 22 of fabric supported from a bar 24 extending across brackets 26 secured to side members 28 of a fabric cart 30. The fabric cart 30 may be considered part of the apparatus 10, but is removably attached to the main portion 32 of the apparatus 10 with two aligners 34 (only one being shown). The aligners 34 align the fabric cart 30 with the main portion 32 of the apparatus 10. FIG. 2 shows only the main portion 32 of the apparatus 10. Referring to FIG. 1, the fabric cart 30 further comprises a top member 36 extending between upper ends of the side members 28 of the fabric cart 30 and a bottom member 38 extending between lower ends of the side members 28 of the fabric cart 30. The fabric cart 30 further comprises two horizontally oriented legs 40 (only one being shown). As shown in FIG. 1, two caster wheels 42 are secured to each leg 40 of the fabric cart 30 to facilitate movement of the fabric cart 30.

Although one configuration of fabric cart 30 is shown supporting one roll 32 of fabric, the fabric cart may be any other configuration and may support more than one roll of fabric.

For purposes of this document, the apparatus 10 is oriented in FIG. 1 so that the front of the apparatus is indicated by number 5, the rear by number 6, the left side by number 7 and the right side by number 8.

The main portion 32 of the apparatus 10 comprises a generally rectangular base 44, two generally rectangular sides 46 and a rear brace 48 extending between the generally rectangular sides 46. The generally rectangular base 44 comprises a front base member 50, a rear base member 52 and two side base members 54, each side base member 54 extending between the front and rear base members 50, 52, respectively.

As best seen in FIG. 2, each side 46 comprises a vertically oriented front side member 56, a vertically oriented rear side member 58, a horizontally oriented top side member 60 and a horizontally oriented middle side member 62. The top and middle side members 60, 62 each extend between the front and rear side members 56, 58 on one of the sides 46.

Figure 2B:
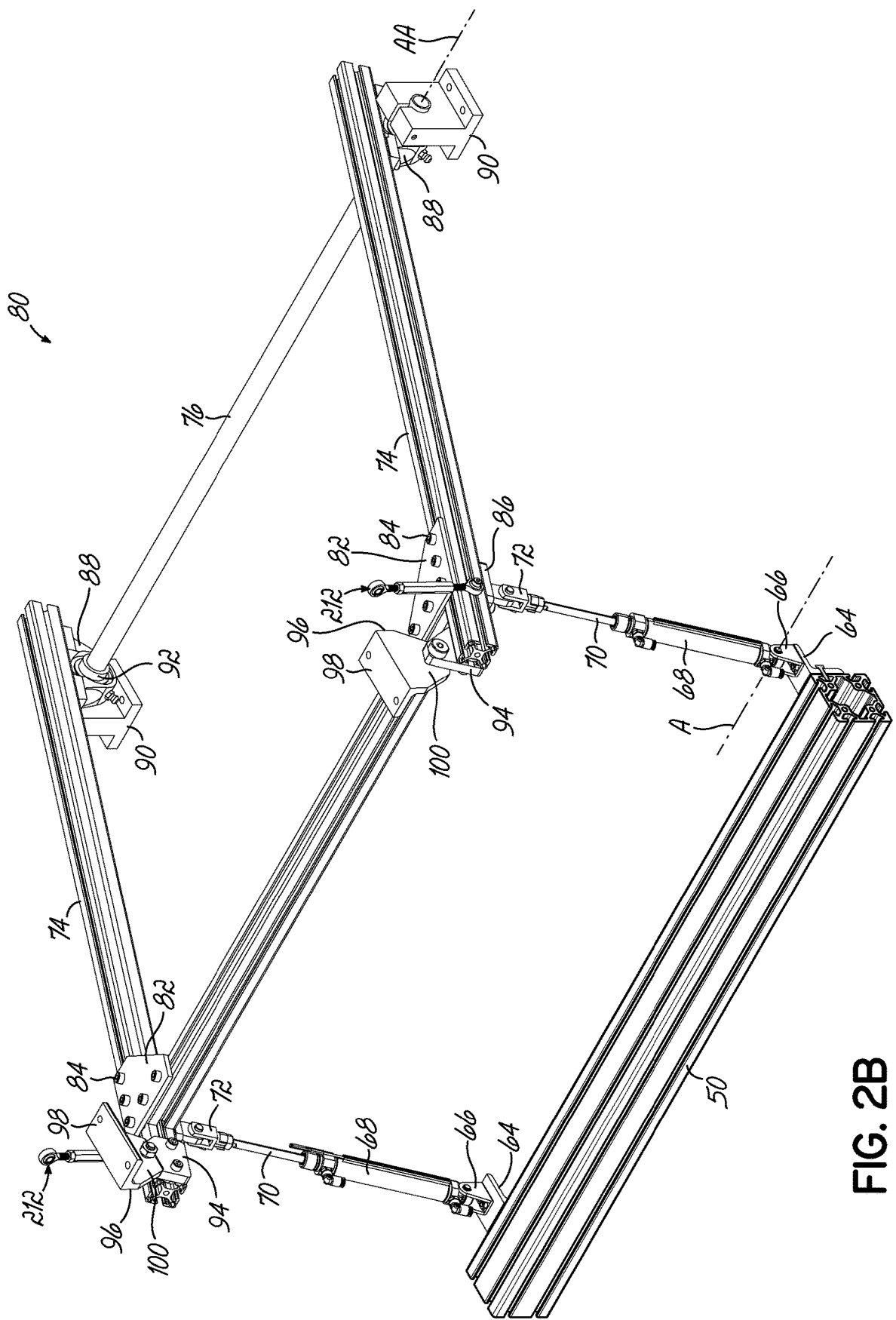
FIG. 2B is a perspective view of the lift assembly of the apparatus of FIG. 1.
Figure 6:
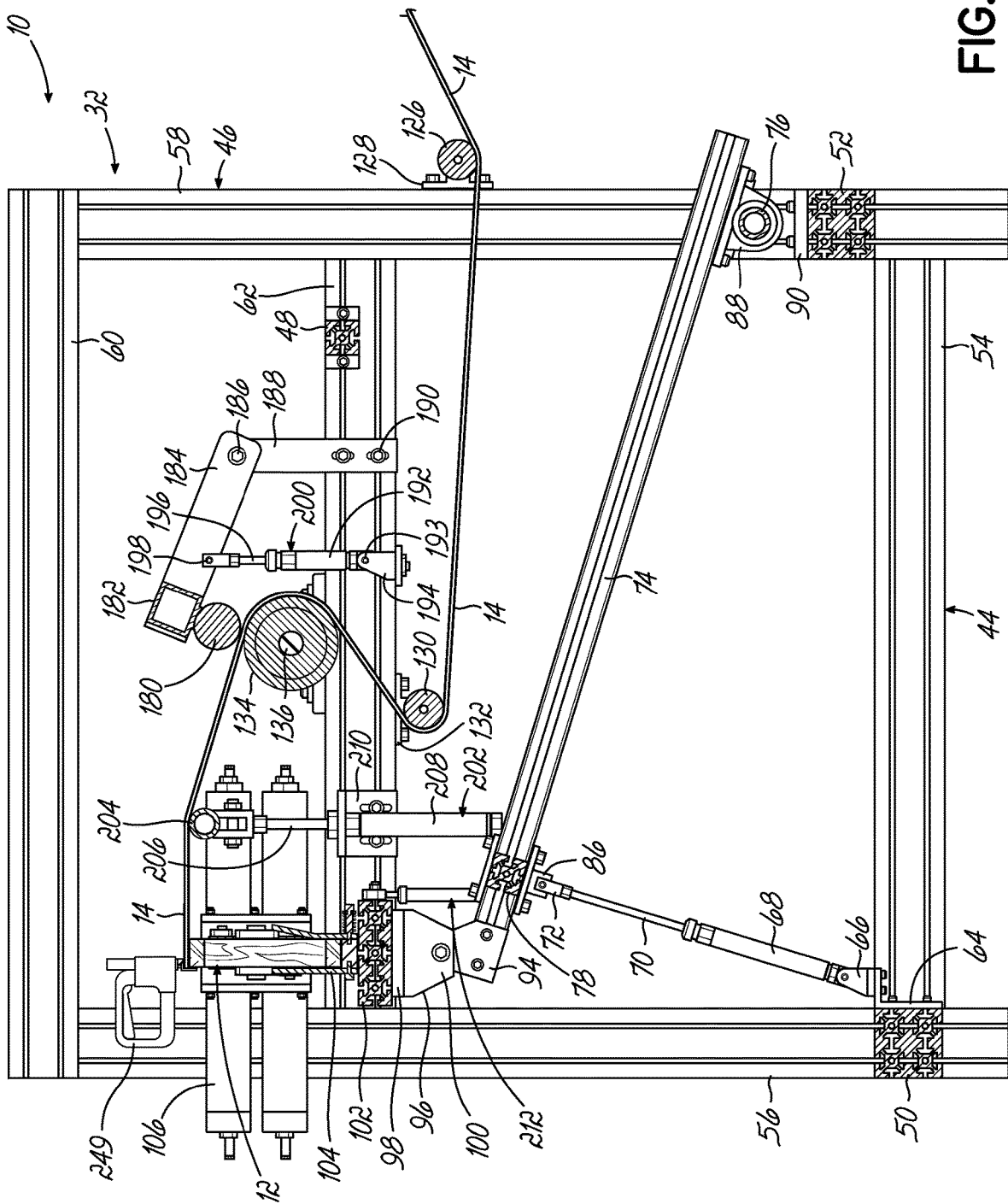
FIG. 6 is a cross sectional view of the apparatus of FIG. 1, showing the truss fixture table in its raised position supporting a truss.

As best illustrated in FIGS. 2B and 6, the main portion 32 of the apparatus 10 further comprises a lift assembly 80 comprising two lift arms 74 and a cross member 78 extending between the lift arms 74. A corner brace 82 is located at the intersection of each lift arm 74 and the cross member 78 for stability purposes and secured to one of the lift arms 74 and the cross member 78 with fasteners 84.

The lift assembly 80 further comprises two L-shaped mounting brackets 64 secured to the front base member 50. A generally U-shaped bracket 66 is secured to each of the L-shaped mounting brackets 64. As best illustrated in FIG. 6, a pneumatic cylinder 68 is pivotally secured to each of the generally U-shaped brackets 66 to pivot about axis A. A piston 70 extends into and out of each pneumatic cylinder 68 and is secured at its upper end to a U-shaped bracket 72, as shown in FIGS. 2B and 6. As best illustrated in FIG. 2B, the U-shaped bracket 72 is secured to a mount 86 which is secured to one of the lift arms 74.

The lift assembly 80 further comprises two bearing mounts 88, each bearing mount 88 being secured to a rear portion of one of the lift arms 74 and further secured to a base 90. Each bearing mount 88 has a bearing 92 therein. An assembly bar 76 extends through each of the bearings 92 and through each of the bases 90 such that the lift assembly 80 pivots about a horizontal pivot axis AA located through the center of the hollow assembly bar 76.

As shown in FIG. 2B, each lift arm 74 of lift assembly 80 has a front bracket 94 secured to a front portion of the lift arm 74. A table support bracket 96 having an upper portion 98 and a lower portion 100 is pivotally secured to each front bracket 94.

As best shown in FIGS. 2 and 6, a truss table 102 is secured to the upper portions 98 of the table support brackets 96. Two spring biased clamps 104 are secured to the truss table 102 for holding the truss 12, as shown in FIG. 1. Although two spring biased clamps 104 are shown in the drawings, any number of spring biased clamps may be used.

Figure 3A:
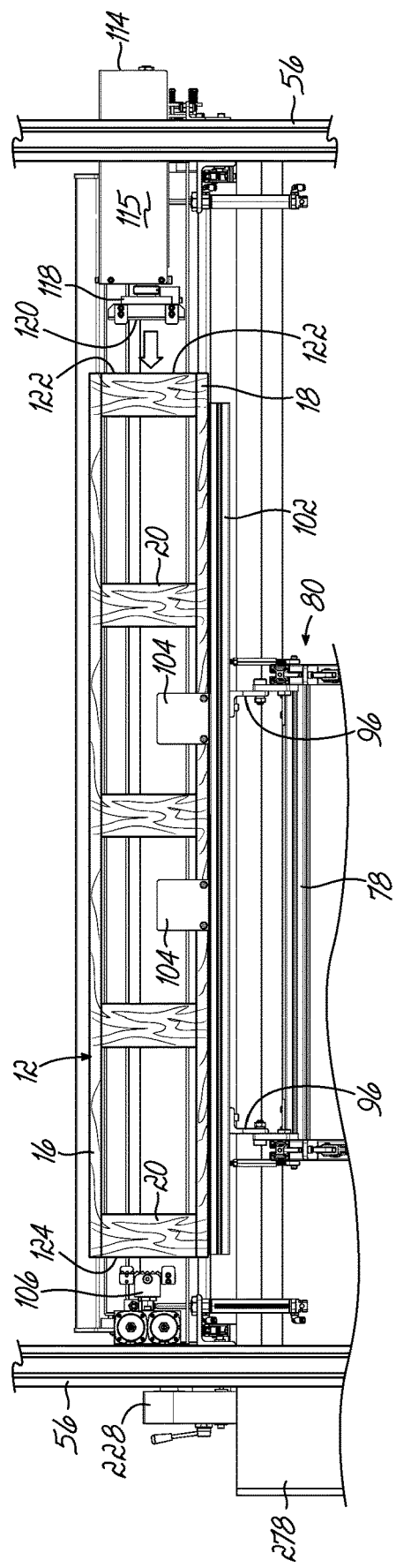
FIG. 3A is a front elevational view of a truss resting upon the truss fixture table before the vise mechanisms clamp or pinch the truss therebetween.
Figure 3B:
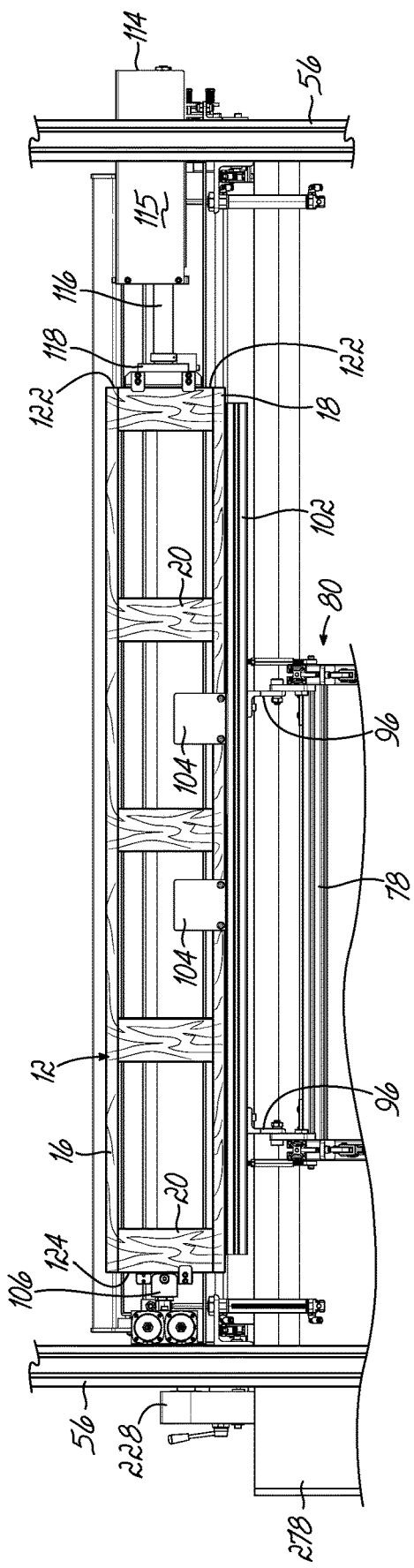
FIG. 3B is a front elevational view of a truss resting upon the truss fixture table, the vise mechanisms clamping or pinching the truss therebetween.

The apparatus 10 further comprises a first or left vise mechanism 106 for rotating the left side of a truss 12. One type of first or left vise mechanism is available from Bimba® Manufacturing under the trademark Pneu-Turn® at the website https://www.bimba.com/Products-and-Cad/Actuators/Inch/Rotary/Rack-Pinion/Pneu-Turn. The left vise mechanism 106 does not move linearly but instead only rotates. As seen in FIG. 2A, the left vise mechanism 106 comprises a rotatable shaft 108 terminating in a holder 110 which secures a jaw 112 therein. The jaw may be interchangeable so provide different types of surfaces to contact the truss 12. FIG. 3A shows the jaw 112 of the left vise mechanism 106 slightly spaced from the left end surface 124 of the truss 12. FIG. 3B shows the jaw 112 of the left vise mechanism 106 contacting the left end surface 124 of the truss 12.

The apparatus 10 further comprises a second or right vise mechanism 114 for rotating the right side of a truss 12. One type of second or right vise mechanism is available from Bimba® Manufacturing under the name Triple Rod at the website https://www.bimba.com/Products-and-Cad/Actuators/Inch/NFPA/Tie-Rod/TRA-Series-Triple-Rod. As shown in FIGS. 3A and 3B, the right vise mechanism 114 moves a rotatable shaft 116 terminating in a holder 118 linearly. The holder 118 secures a jaw 120 therein. The jaw 120 may be interchangeable so provide different types of surfaces to contact the truss 12. FIG. 3A shows the jaw 120 spaced from the right end surface 122 of the truss 12, the rotatable shaft 116 of the right vise mechanism 114 being in a closed position mostly inside a housing 115. FIG. 3B shows the jaw 120 contacting the right end surface 122 of the truss 12, the rotatable shaft 116 of the right vise mechanism 114 being in an expanded position.

As best shown in FIG. 6, the main portion 32 of apparatus 10 further comprises an outer idle roller 126 suspended by two outer brackets 128. Each outer bracket 128 is secured to the vertically oriented rear side member 58 of one of the sides 46. FIG. 6 only shows one outer bracket 128.

As best shown in FIG. 6, the main portion 32 of apparatus 10 further comprises a low idle roller 130 suspended by two suspension brackets 132. Each suspension bracket 132 is secured to one of the horizontally oriented middle side members 62 of one of the sides 46. FIG. 6 only shows one suspension bracket 132.

Figure 8:
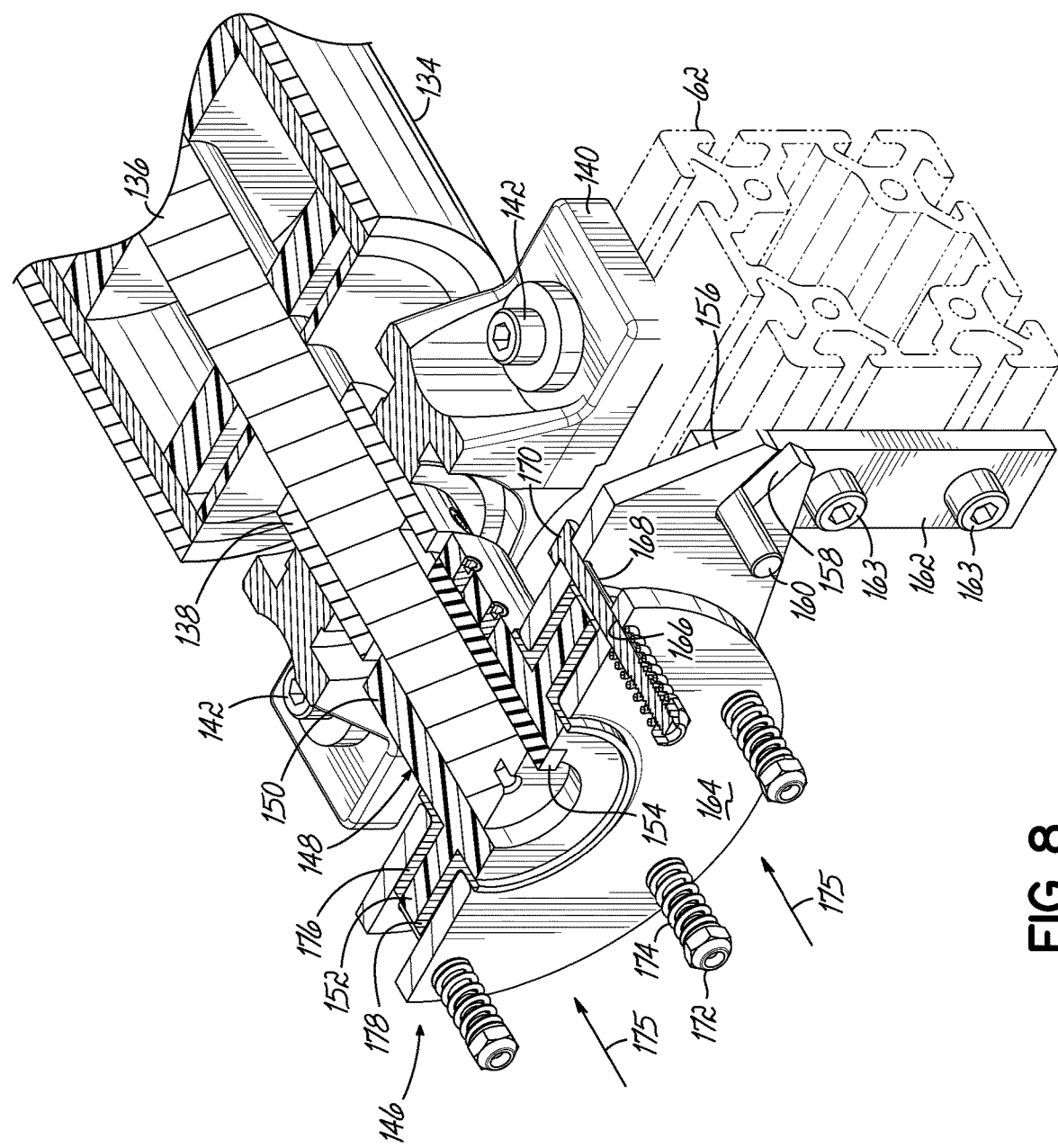
FIG. 8 is a cross sectional view illustrating the brake mechanism of the apparatus.
Figure 9:
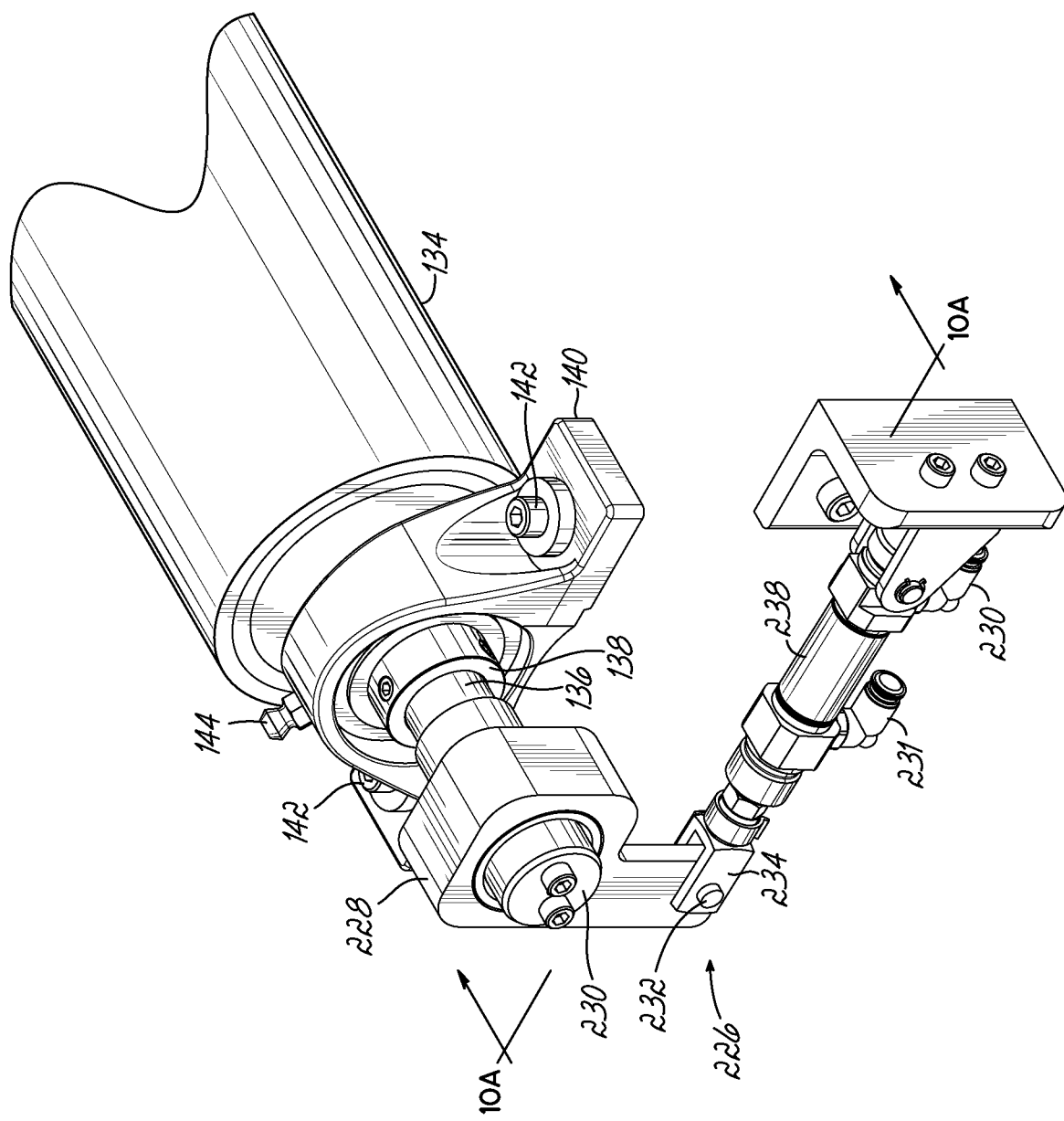
FIG. 9 is a perspective view of the ratcheting mechanism of the apparatus.

As best shown in FIGS. 6 and 8, the main portion 32 of apparatus 10 further comprises a rotatable tension roller 134 surrounding a shaft 136. The rotatable shaft 136 extends through a bearing 138 which is suspended inside a bearing housing 140 (only one being shown in FIG. 8). The bearing housing 140 at each end of shaft 136 is secured an upper surface of one of the horizontally oriented middle side members 62 of one of the sides 46 with fasteners 142, best shown in FIG. 8. FIG. 9 shows a grease fitting 144 for introducing grease into bearing 138.

As best shown in FIG. 8, a spring-loaded brake assembly 146 is located at one end (the right end) of the main portion 32 of apparatus 10. The spring-loaded brake assembly 146 comprises a rotatable brake member 148 having an annular portion 150 surrounding the rotatable shaft 136 and a disk portion 152 extending outwardly from the annular portion 150 of the rotatable brake member 148. A key 154 secures the rotatable brake member 148 to the rotatable shaft 136 so both rotate together. When fabric is pulled through the main portion 32 of apparatus 10, the tension roller 134 rotates along with the rotatable shaft 136 which causes the rotatable brake member 148 to rotate. The spring-loaded brake assembly 146 further comprises a stationary inner brake member 156 having a groove 158 inside which resides a pin 160, as shown in FIG. 8. As shown in FIG. 8, the pin 160 extends outwardly from stationary plate 162, the stationary plate 162 being secured to an outer surface of one of the horizontally oriented middle side members 62 of one of the sides 46 with fasteners 163.

The spring-loaded brake assembly 146 further comprises an outer brake disk 164 which has a plurality of openings 166 through which pass bolts 168 (only one being shown in cross-section in FIG. 8). Each bolt 168 has a head 170 inside the stationary inner brake member 156 and a removable nut 172 secured to a threaded outer end of the bolt 168. A spring 174 surrounds each bolt 168 between the removable nut 172 and the outer brake disk 164 to exert an inwardly directed force shown by arrows 175 shown in FIG. 8. As shown in FIG. 8, an inner liner 176 is located between the stationary inner brake member 156 and the rotatable brake member 148 to avoid metal to metal contact. Similarly, an outer liner 178 is located between the outer brake disk 164 and the rotatable brake member 148 to avoid metal to metal contact. The inner and outer liners 176, 178 are made of nylon, but may be made of any common brake lining material. The springs 174 are selected to exert a desired amount of compression force to the liners which squeeze the rotatable brake member 148 therebetween thereby slowing the rotation of the rotatable shaft 136 and rotatable tension roller 134 surrounding rotatable shaft 136.

Figure 5:
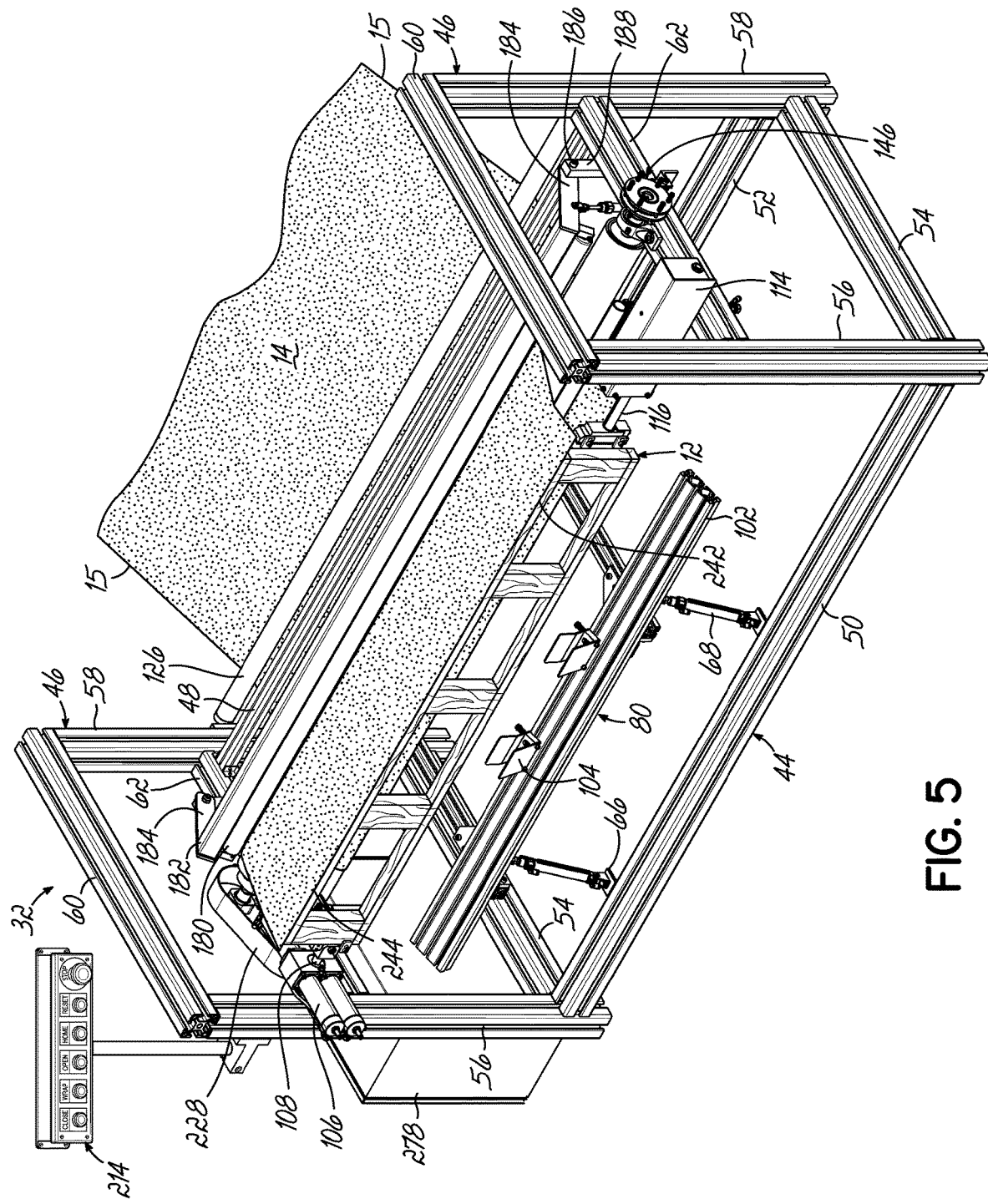
FIG. 5 is a perspective view of the apparatus of FIG. 1, showing the truss clamped or pinched between the vise mechanisms and the truss fixture table being in its lowered position.

As best illustrated in FIGS. 5 and 6, the main portion 32 of apparatus 10 further comprises a non-rotatable pressure shaft 180 welded or otherwise secured to a pressure bar 182 extending from right-to-left between side links 184. As best shown in FIG. 6, each of the side links 184 is pivotally joined at locations 186 to stationary links 188 which are secured to one of the horizontally oriented middle side members 62 of one of the sides 46 with fasteners 190.

As best shown in FIG. 6, a pneumatic tensioner 200 exerts a desired amount of pressure on the fabric as the fabric wraps around the tension roller 134. Each pneumatic tensioner comprises a pneumatic tension cylinder 192 pivotally secured at location 193 to one of the horizontally oriented middle side members 62 of one of the sides 46 with a tension bracket 194. A tension rod 196 is pivotally secured to each of the side links 184 at its upper end to pivot about location 198.

As best illustrated in FIGS. 5 and 6, the main portion 32 of apparatus 10 further comprises a lifter 202 comprising a non-rotatable lifter bar 204 raised and lowered by a pneumatic piston 206 and cylinder 208. Each pneumatic cylinder 208 is mounted to one of the horizontally oriented middle side members 62 of one of the sides 46 with a lifter bracket 210. The two lifters 202 function to lift the fabric web 14 extending through the main portion 32 of apparatus 10 for purposes of cutting the fabric web 14 at the end of the process described herein.

As best shown in FIG. 6, two stabilizers 212 assist controlling movement of the truss table 102. Each stabilizer 212 is secured at its upper end to truss table 102. As best shown in FIG. 2B, each stabilizer 212 is secured at its lower end to one of the lift arms 74. The two stabilizers 212 help fix the location of the truss table 102 relative to the lift arms 74 and provide stability to the truss table 102 during movement thereof.

As best shown in FIGS. 1 and 2, the main portion 32 of apparatus 10 further comprises a control panel 214 having from left to right: a close button 216, a wrap button 218, an open button 220, a home button 222 and a stop button 224.

Figure 10A:
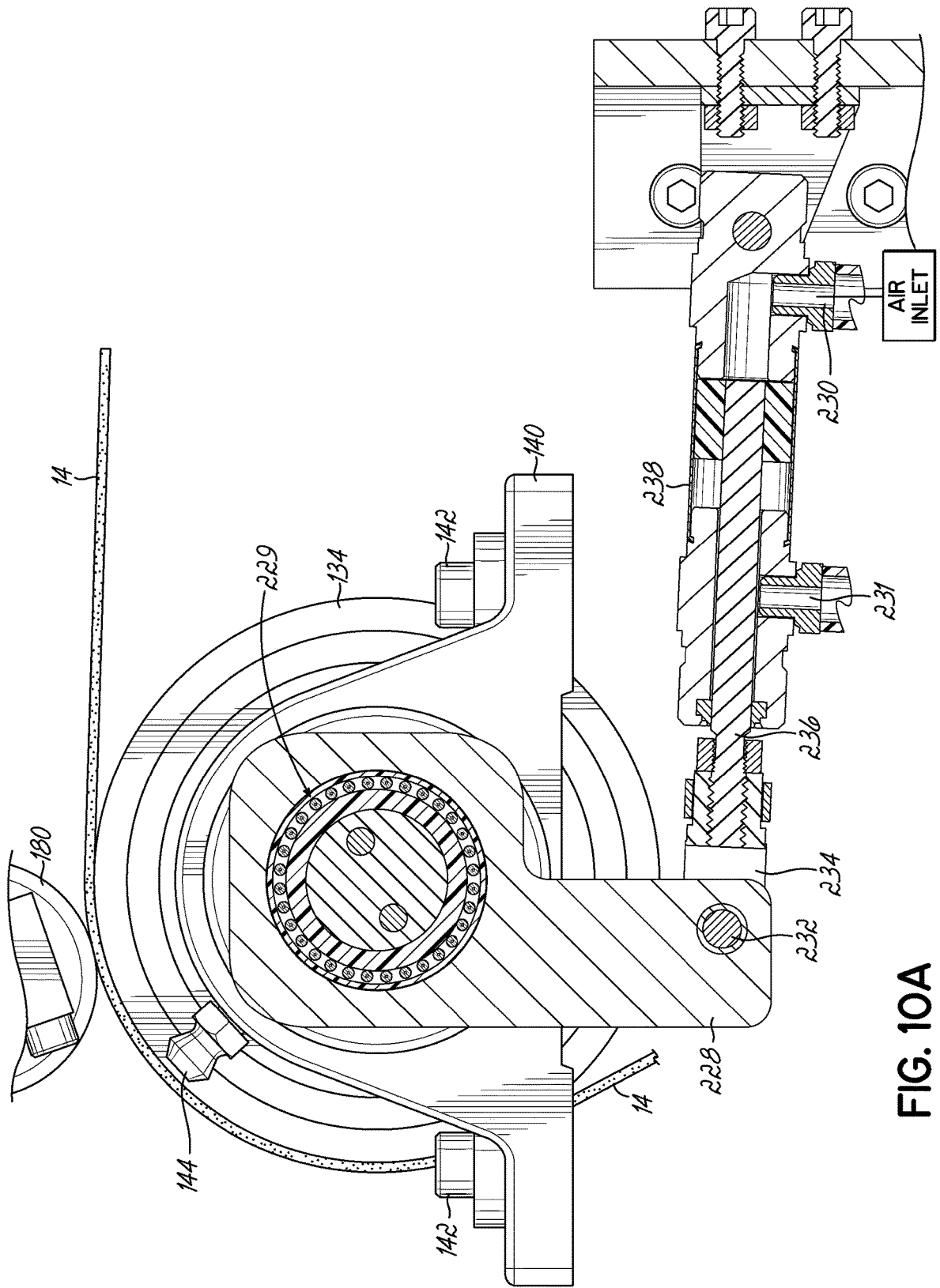
FIG. 10A is a cross sectional view taken along the line 10A-10A of FIG. 9.
Figure 10B:
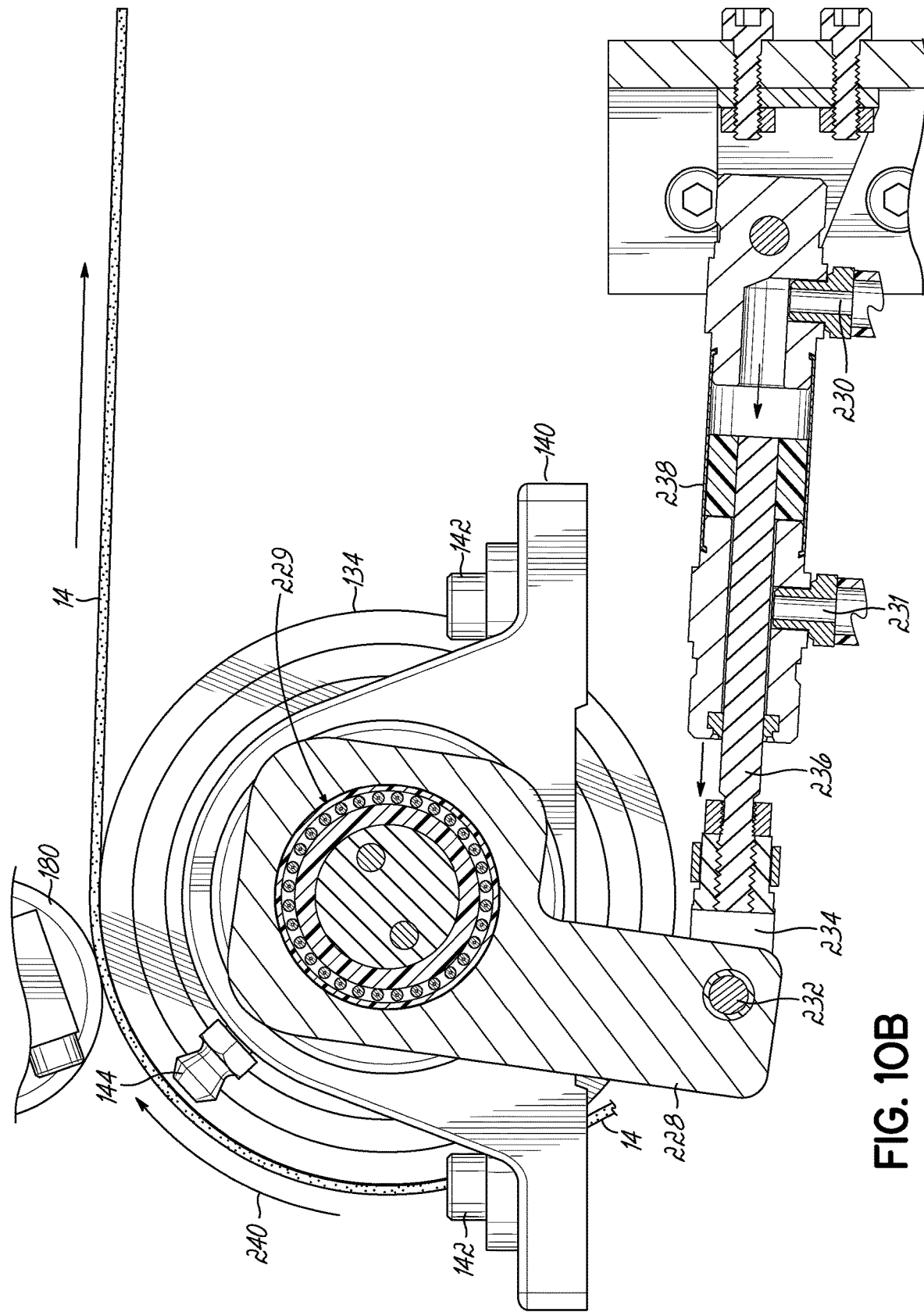
FIG. 10B is a cross sectional view showing movement of the ratchet of FIG. 10A.
Figure 10C:
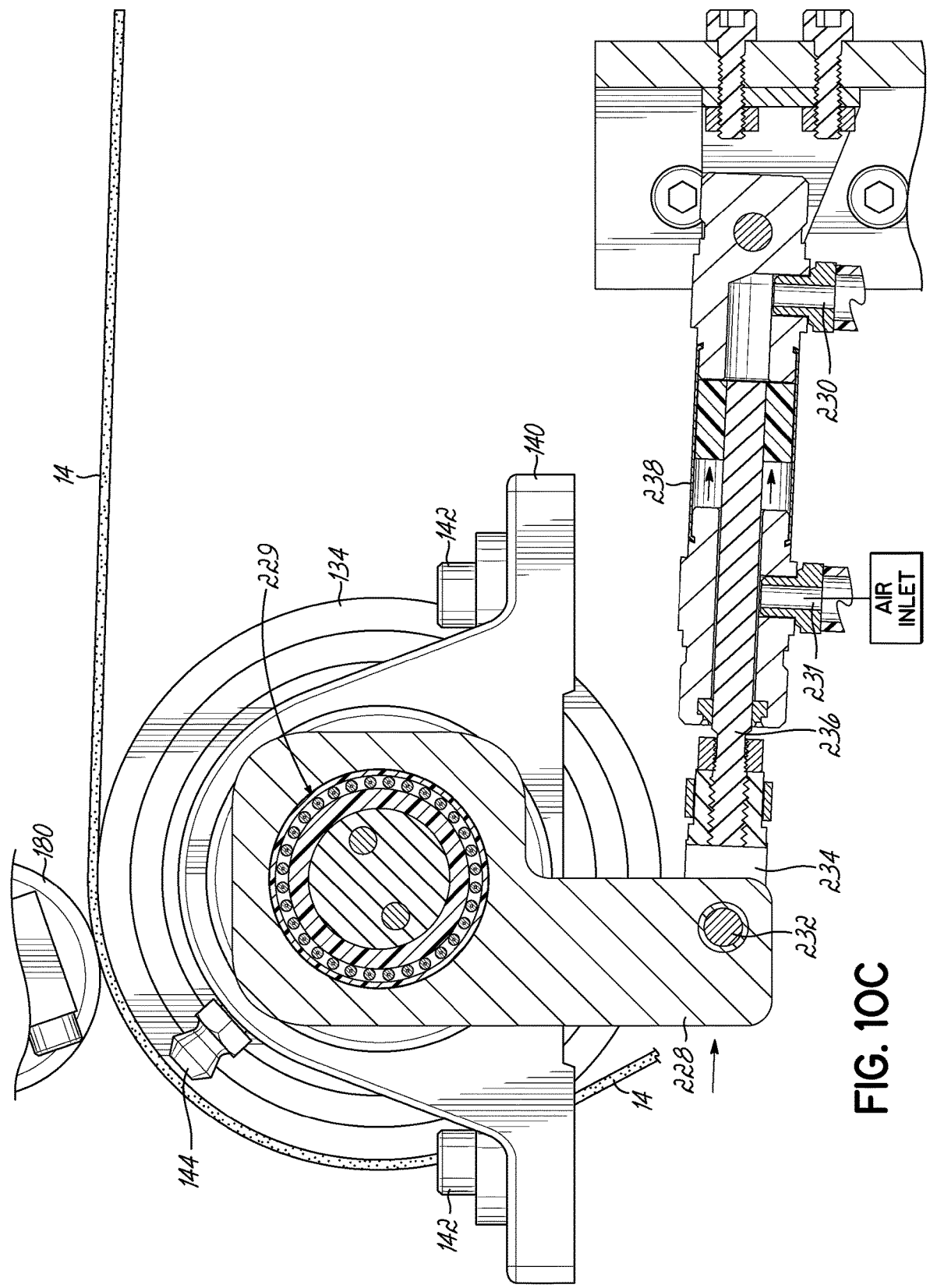
FIG. 10C is a cross sectional view showing movement of the ratchet of FIG. 10A.

As best shown in FIGS. 9-10C, the main portion 32 of apparatus 10 further comprises a ratchet unit 226 protected by a cover 228 shown in FIGS. 1 and 2 on the left side of the main portion 32 of apparatus 10. As best shown in FIG. 9, ratchet unit 226 comprises a ratchet housing 228, a one way bearing 229 secured in the ratchet housing 228, two pneumatic ports 230, 231, a pivot pin 232 securing a U-shaped bracket 234 to the ratchet housing 228, a piston 236 movable inside a pneumatic cylinder 238. FIG. 10A illustrates the piston 236 in its home position and air entering the pneumatic port 230. FIG. 10B illustrates the piston 236 moving left or extending outwardly from its home position and moving the ratchet housing 228 in a clockwise direction as shown by arrow 240. The clockwise movement of the ratchet housing 228 moves the tension roller 134 in a clockwise direction. FIG. 10C illustrates the piston 236 returning to its home position and air entering the pneumatic port 231.

Figure 4:
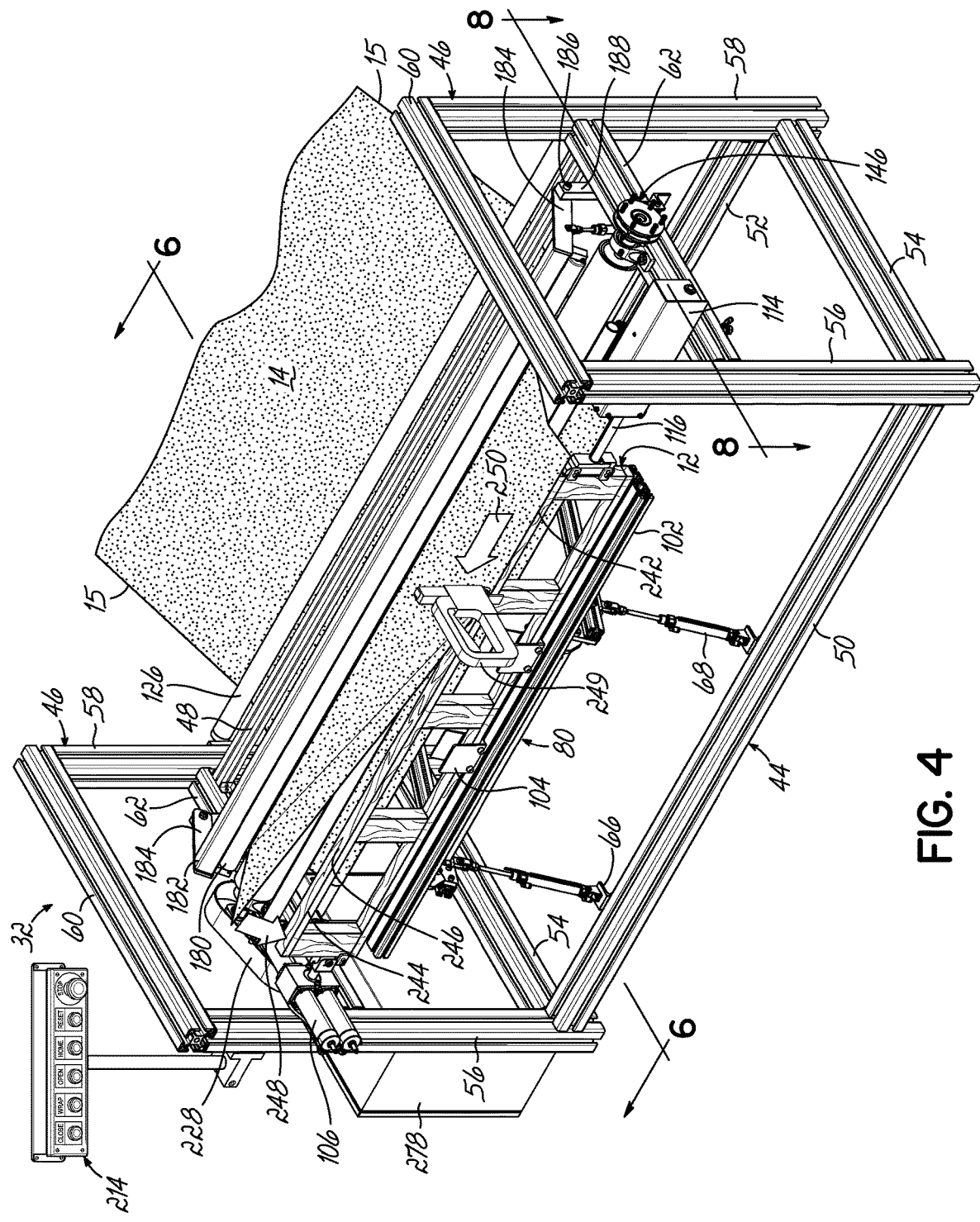
FIG. 4 is a perspective view of the apparatus of FIG. 1, showing the fabric being initially stapled to the truss with a stapler (the operator not being shown).
Figure 7A:
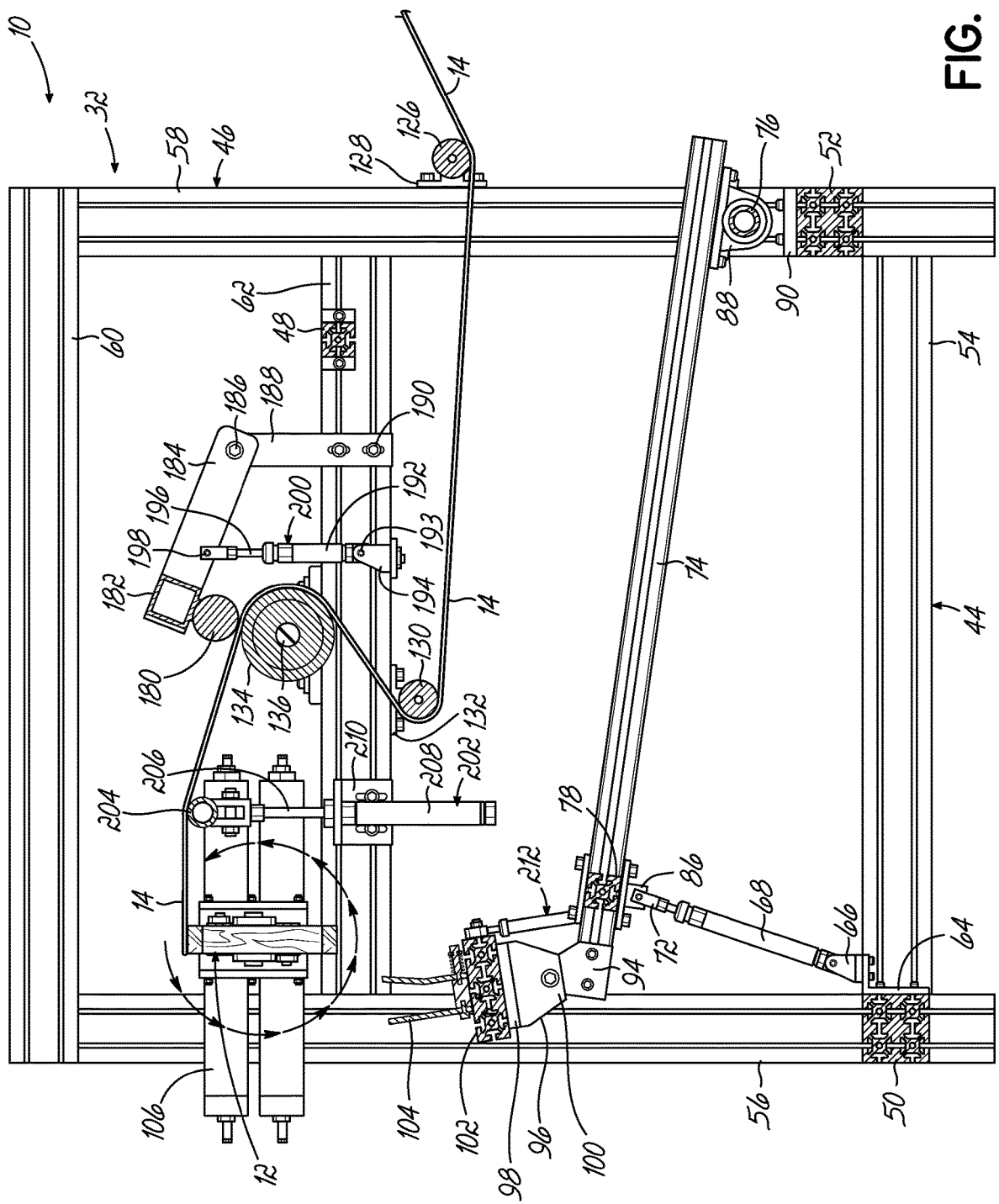
FIG. 7A is a cross sectional view, similar to FIG. 6, showing the truss fixture table in its lowered position and the pinched truss being rotated by the vise mechanisms.
Figure 7B:
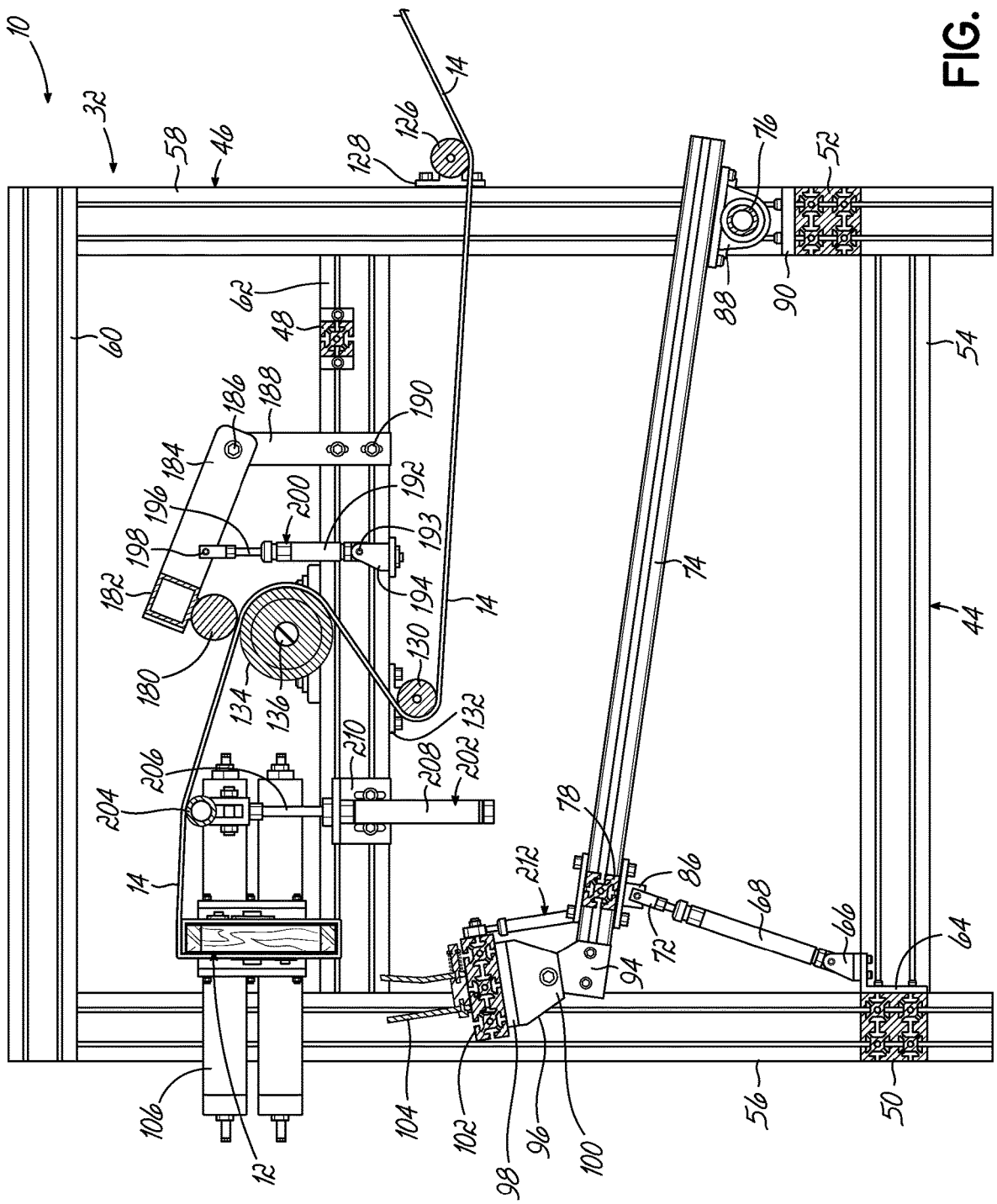
FIG. 7B is a cross sectional view, similar to FIG. 7A, showing the truss fixture table in its lowered position and the pinched truss having completed one full rotation.

The ratchet unit 226 functions to advance the fabric web 14 the width (the linear distance from the front edge to the rear edge of the upper member) of a truss 12. As shown in FIG. 7D, after the fabric web 14 is cut along the rear edge of the upper member 16 of a truss 12, the fabric web 14 must be advanced to the front edge of the upper member 16 of the next truss 12 to be wrapped. The ratchet unit 226 advances the fabric web 14 this linear distance so the front edge of the fabric web 14 aligns with the front edge of the upper member 16 of the truss 12 as shown in FIG. 4.

As best shown in FIGS. 1 and 2, an electrical enclosure 278 is secured to the left side 46. Each of the cylinders described herein is pneumatically controlled to move the piston or rode associated with it between extended and retracted positions. Any known pneumatic control system may be used to activate the cylinders.

Turning to the method of operation of the apparatus 10, FIG. 2 shows a truss 12 being inserted onto the truss table 102 between two sets of spring biased clamps 104. FIG. 3A shows the left vise mechanism 106 in its home position and the right vise mechanism 114 in its home position. FIG. 3A shows the truss 12 spaced from each of the jaws of the left and right vise mechanisms 106, 114, respectively.

After an operator pushes the close button 216 on the control panel 214, the rotatable shaft 116 of the right vise mechanism 114 extends outwardly towards the left vise mechanism 106 from the housing 115. The jaw 120 of the right vise mechanism 114 contacts the right end surface 122 of the truss 12 and pushes the truss 12 to the left until the left end surface 124 of truss 12 contacts the jaw 112 of the left vise mechanism 106. The rotatable shaft 116 of the right vise mechanism 114 extends outwardly further until the truss 12 is sandwiched between the jaws 112, 120 of the left and right vise mechanisms 106, 114, respectively.

FIG. 4 illustrates a front edge 242 of the fabric web 14 being pulled forwardly to align with a front edge 244 of the upper member 16 of the truss 12. See arrow 248 in FIG. 4. An operator then staples the fabric web 14 to the upper surface 246 of the upper member 16 of the truss 12 with a stapler 249. The stapler 249 is shown moving right to left by the arrow 250 in FIG. 4, but may move the opposite direction.

Figure 4A:
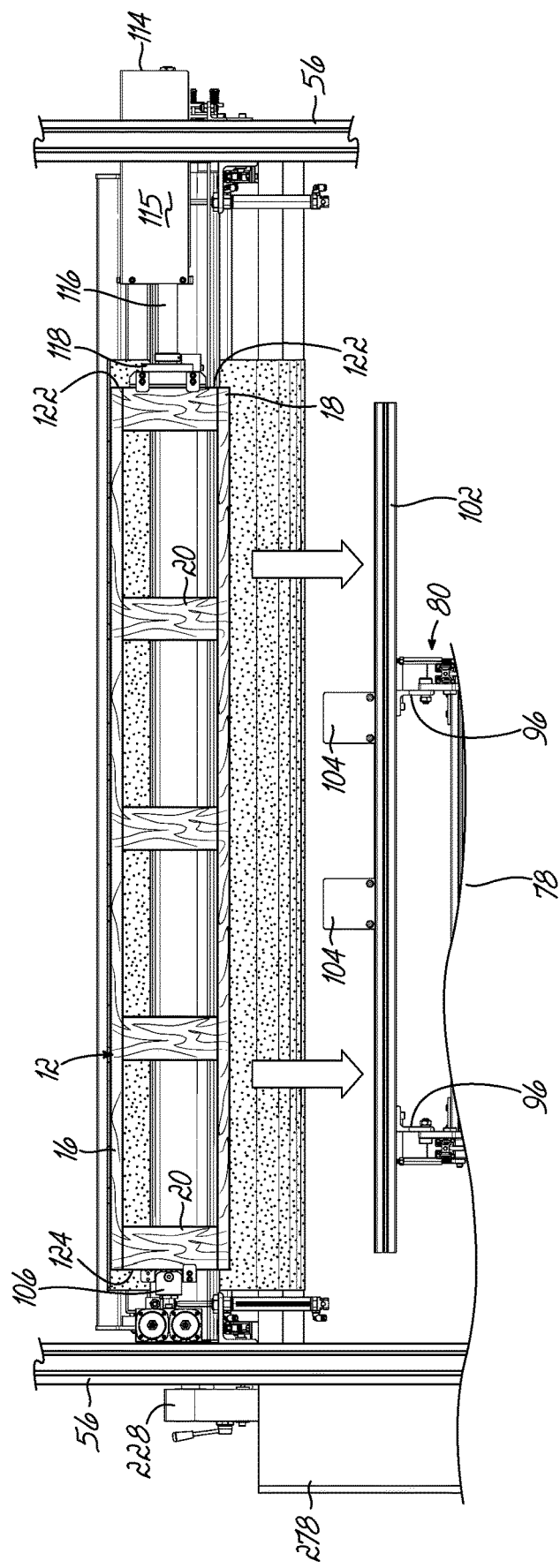
FIG. 4A is a front elevational view of a truss clamped or pinched between the vise mechanisms and the truss fixture table being lowered.

An operator then hits the wrap button 218 on control panel 214 which causes the truss table 102 to lower as shown in FIGS. 4A and 5. At this point, the truss 12 is suspended and supported by only the vise mechanisms 106, 114. The truss 12 is sandwiched and clamped between the jaws 112, 120 of the vise mechanisms 106, 114, respectively. As shown in FIG. 5, the truss table 102 is in its lowered position. As shown in FIG. 7A, the vise mechanisms 106, 114 rotate the suspended truss 12 in a counter-clockwise direction until the suspended truss 12 becomes fully wrapped in fabric, as pictured in FIG. 7B. As shown in FIG. 7B, the fabric web 14 passes over the portion of the fabric web 14 already stapled or secured to the upper surface 246 of the upper member 16 of truss 12.

Figure 7C:
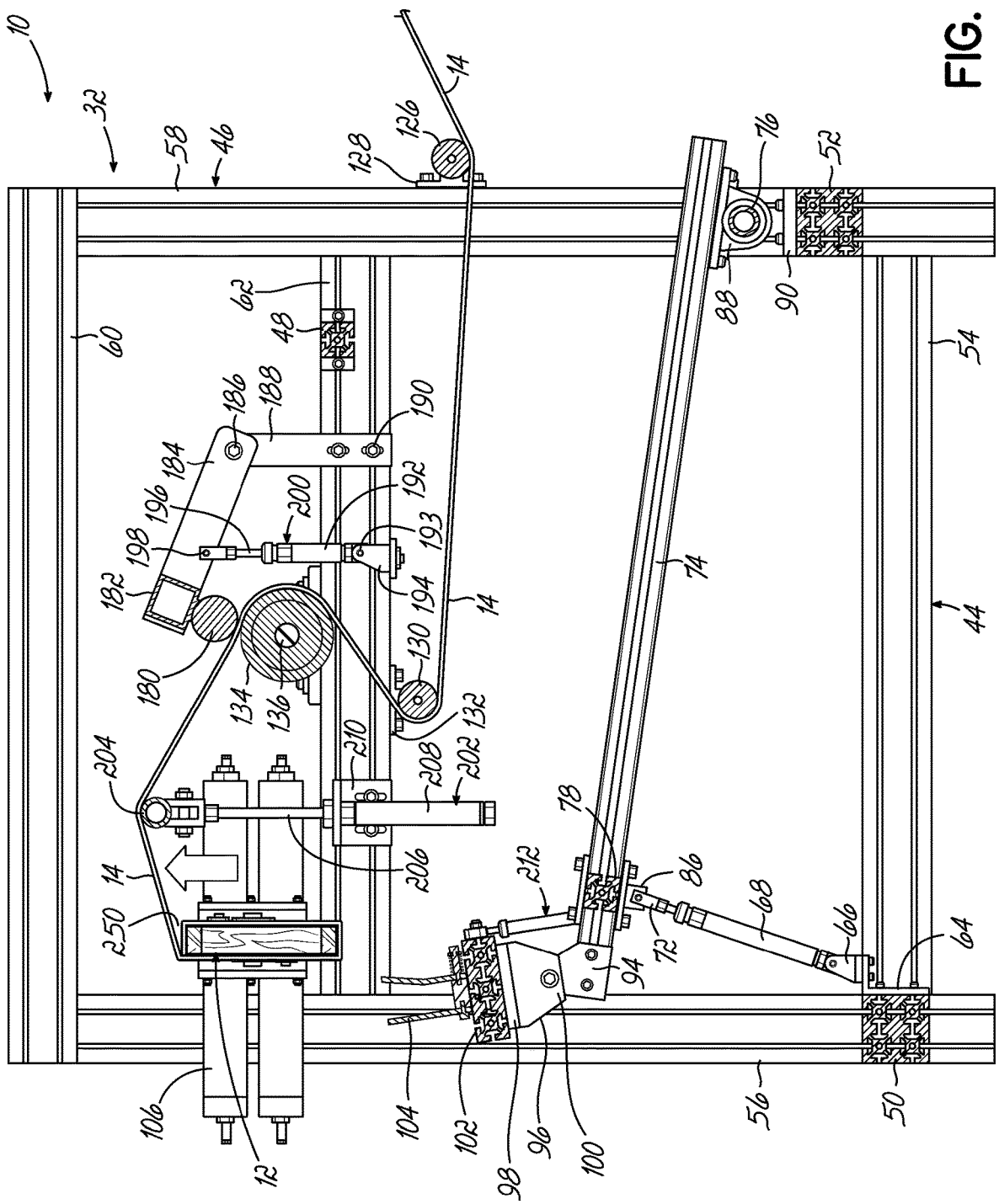
FIG. 7C is a cross sectional view, similar to FIG. 7B, showing the tension bar being in its raised position to facilitate cutting the fabric.
Figure 7D:
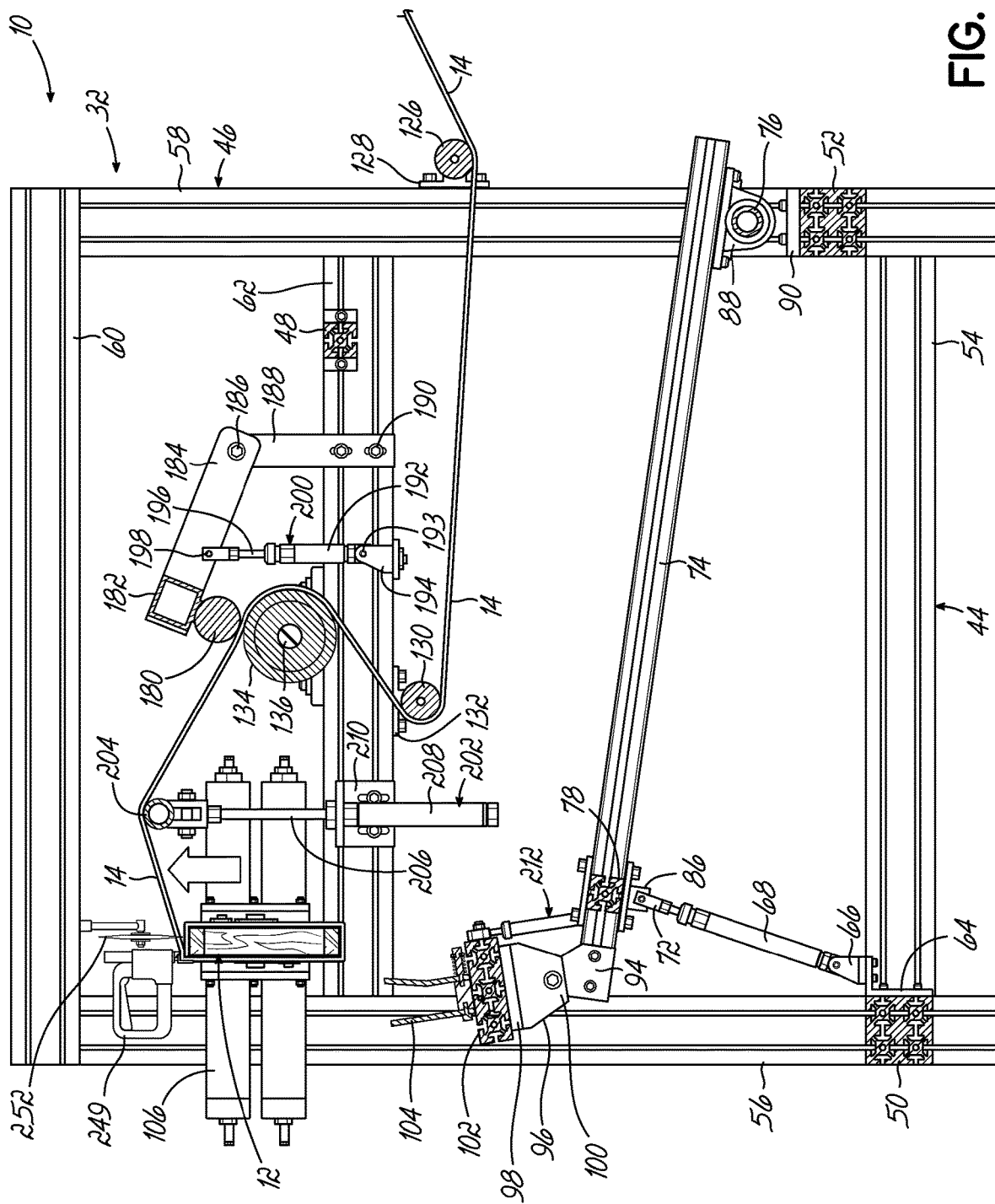
FIG. 7D is a cross sectional view, similar to FIG. 7C, showing the raised fabric being cut with a cutter blade.
Figure 11A:
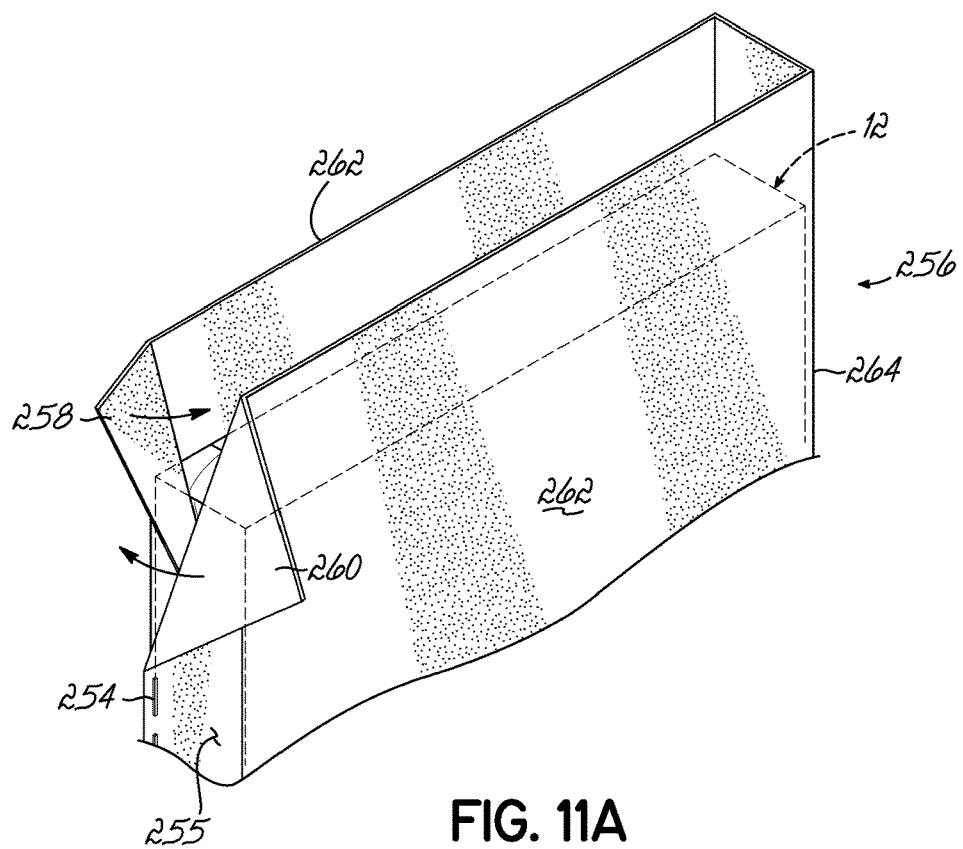
FIG. 11A is a perspective view showing folding and stapling of the fabric along an upper surface of a truss.

As shown in FIG. 7C, after the rotation of the jaws 112, 120 of the vise mechanisms 106, 114, respectively, the lifter bar 204 raises up to lift the fabric web 14 immediately behind the suspended truss 12. This movement creates a gap 250 which makes it easier for a blade 252 to move along and cut the fabric web 14 as shown in FIG. 7D. After the fabric web 14 is stapled to the top of the truss 12, it is cut. See staples 254 in FIG. 11A. As shown in FIG. 11A, when the stapling is done, the top surface 255 of the semi-covered truss 256 has two layers, a lower layer 258 and an upper layer 260. The two side surfaces 262 and bottom surface 264 of the semi-covered truss 256 have only one layer, as shown in FIG. 11A. After the last stapling is completed, an operator pushes the open button 222 on control panel 214 which causes the jaw 120 and shaft 116 of the vise mechanism 114 to retract linearly (move to the right) to separate the jaws and allow the semi-covered truss 12 to be pulled off the truss table 102.

Figure 11B:
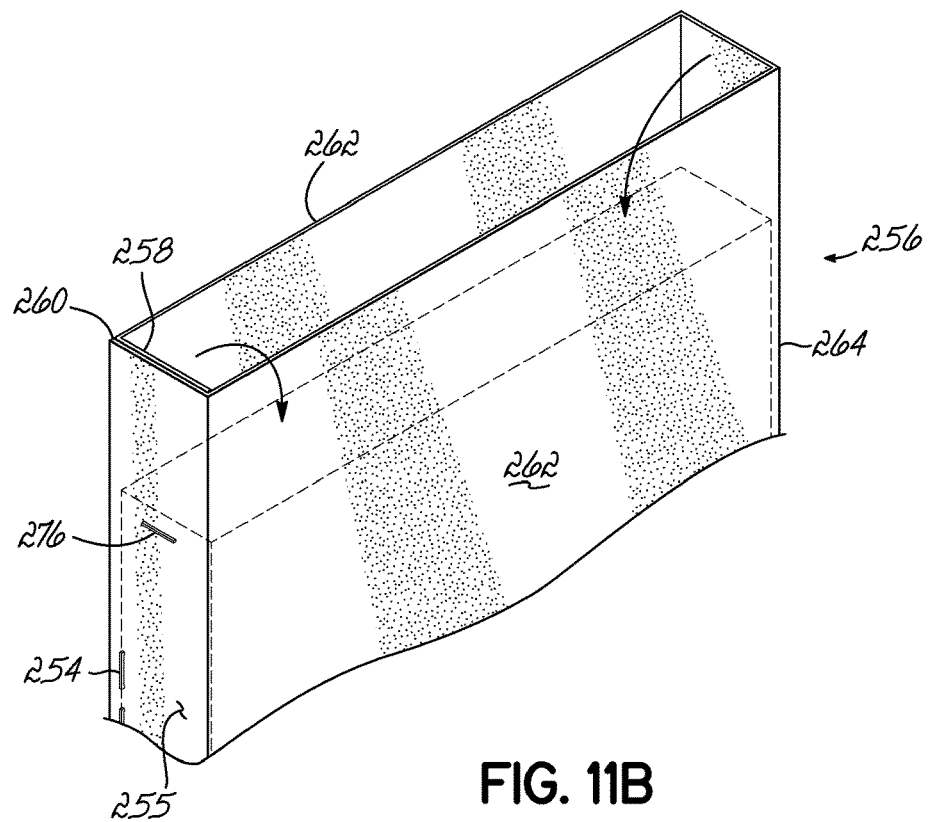
FIG. 11B is a perspective view showing folding of the fabric along an end surface of the truss of FIG. 11A.
Figure 11C:
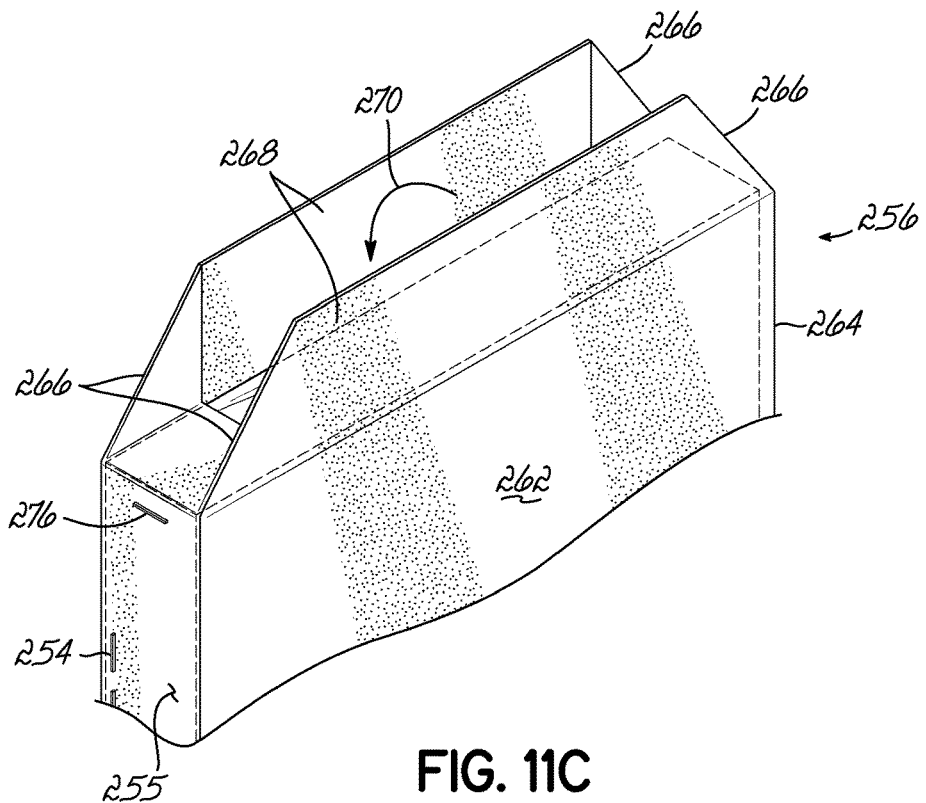
FIG. 11C is a perspective view showing further folding of the fabric along an end surface of the truss of FIG. 11B.
Figure 11D:
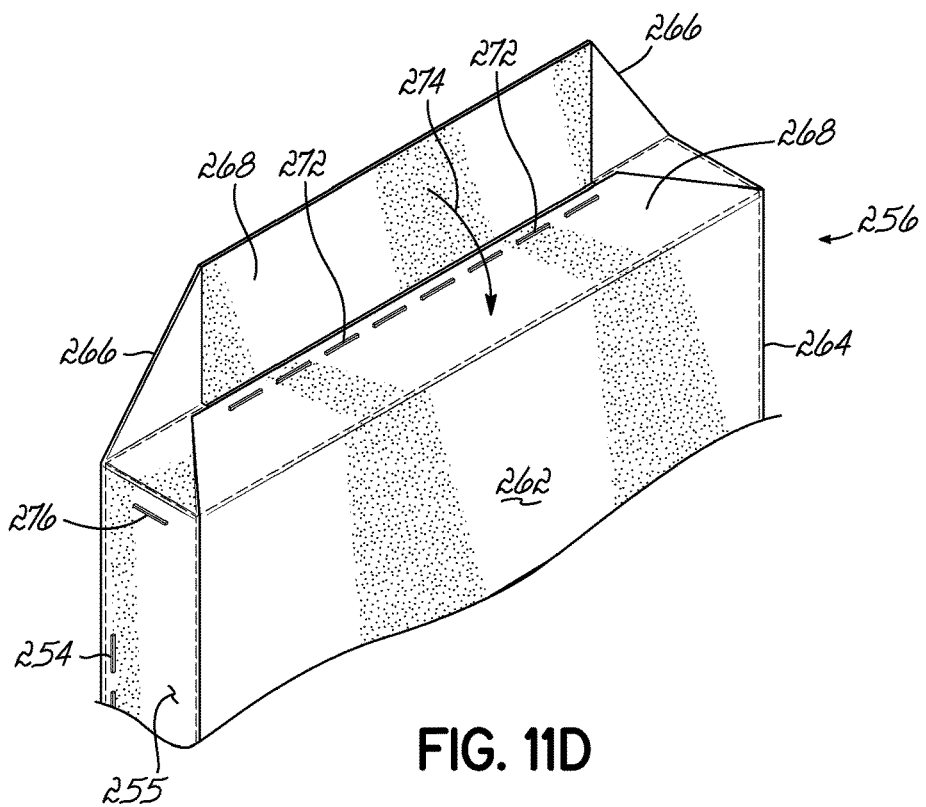
FIG. 11D is a perspective view showing stapling and further folding of the fabric along an end surface of the truss of FIG. 11C.
Figure 11E:
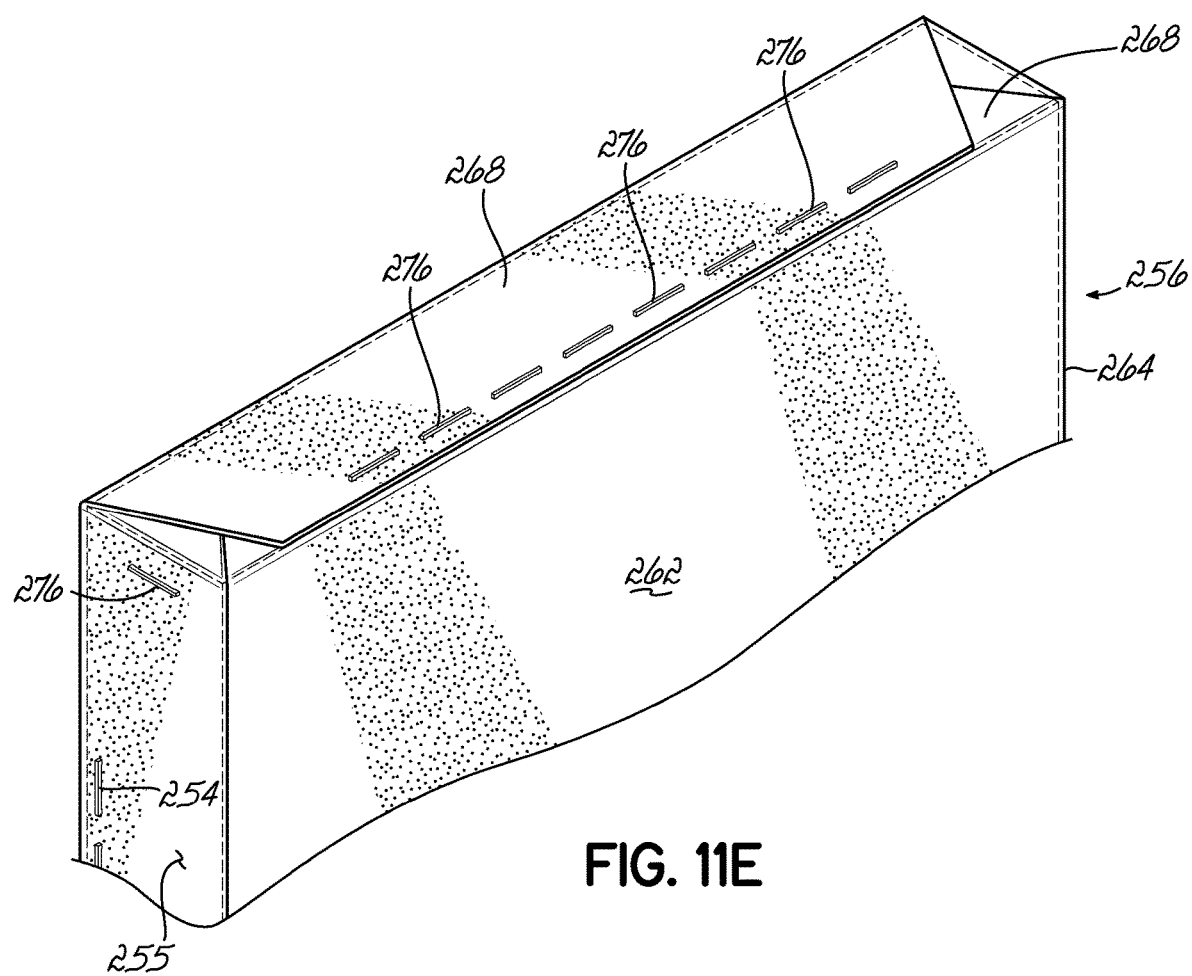
FIG. 11E is a perspective view showing a finished end surface of the truss of FIG. 11D.

As shown in FIG. 11B, at each end of the semi-covered truss 256 (only one being shown) the fabric is further secured in place with staple 276. As shown in FIG. 11C, at each end of the semi-covered truss 256 (only one being shown) the fabric is folded along fold lines 266 to form two tabs 268. One of the tabs 268 is folded downwardly as shown by arrow 270 in FIG. 11C to contact the exposed end surface of the semi-covered truss 256 and stapled in place with staples 272. As shown in FIG. 11D, the other tab 268 is folded over the top of the stapled tab 268 in the direction of arrow 274 and secured in place with staples 276 as shown in FIG. 11E.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A method of upholstering a truss for a bedding foundation, the method comprising:
   providing an apparatus comprising a base, two sides secured to the base, a truss table movable between raised and lowered positions;
   inserting a truss onto the truss table between clamps;

moving a first vise mechanism towards a second vise mechanism to pinch the truss between jaws of the first and second vise mechanisms; at least one of the first and second vise mechanisms being movable to pinch the truss between the vise mechanisms so the vise mechanisms rotate the truss with the truss fixture table in a lowered position;

stapling a fabric web to the truss;

lowering the truss table so the truss is supported by only the vise mechanisms, creating a suspended truss;

rotating the suspended truss by rotating the vise mechanisms to wrap the suspended truss in fabric;

cutting the fabric web;

further stapling the fabric web to the suspended truss to create a semi-covered truss; and separating the vise mechanisms to allow the semi-covered truss to be separated from the apparatus.

2. The method of claim 1, wherein stapling a fabric web to the truss comprises aligning a front edge of the fabric web with a front edge of an upper member of the truss before stapling the fabric web to the truss.

3. The method of claim 1, wherein lowering the truss table comprises using pneumatically controlled cylinders.

4. The method of claim 1, wherein cutting the fabric web comprises moving a blade across the fabric web after raising the fabric web with a lifter bar.

5. The method of claim 1, further comprising covering end surfaces of the semi-covered truss with fabric and stapling the fabric to the truss.

6. The method of claim 5, wherein the fabric at each end is folded into tabs which are stapled to the truss.

7. The method of claim 4, wherein raising the lifter bar comprises using pneumatically controlled cylinders.

* * * * *